(12) United States Patent
Angeletti et al.

(10) Patent No.: US 7,784,613 B2
(45) Date of Patent: Aug. 31, 2010

(54) REUSABLE WINDSHIELD PALLET

(75) Inventors: Chris Angeletti, Johnstown, OH (US);
Steve Brown, Columbus, OH (US);
Steve Micheli, Rocky Mount, NC (US);
Jeff Wester, Rocky Mount, NC (US);
Mark Clay, Enfield, NC (US); Doug Yaw, Gahanna, OH (US); Dino Lanno, Blacklick, OH (US); Terrell Bunn, Rocky Mount, NC (US); Rich Glover, Rocky Mount, NC (US); Joe Rotolo, Jefferson Hills, PA (US); Mark Barnes, Spring Hope, NC (US); Daniel F. Dufresne, Wichita, KS (US); Al Hoag, Rocky Mount, NC (US)

(73) Assignee: Safelite Group, Inc., Columbus, OH (US)

( * ) Notice: Subject to any disclaimer, the term of this patent is extended or adjusted under 35 U.S.C. 154(b) by 0 days.

(21) Appl. No.: 11/857,281

(22) Filed: Sep. 18, 2007

(65) Prior Publication Data
US 2008/0142391 A1 Jun. 19, 2008

Related U.S. Application Data

(62) Division of application No. 10/759,944, filed on Jan. 16, 2004, now Pat. No. 7,270,236.

(60) Provisional application No. 60/442,719, filed on Jan. 27, 2003.

(51) Int. Cl.
*B65D 85/48* (2006.01)

(52) U.S. Cl. .................... 206/448; 206/454; 211/41.14; 220/4.34; 220/6

(58) Field of Classification Search ................. 206/386, 206/448, 454; 211/41.14, 49.1, 175, 195, 211/199; 220/1.5, 4.31, 4.33, 4.34, 6–8
See application file for complete search history.

(56) References Cited

U.S. PATENT DOCUMENTS

| 2,953,253 | A |   | 2/1958  | Henderson et al. |         |
|-----------|---|---|---------|------------------|---------|
| 2,946,453 | A |   | 2/1959  | Pityo            |         |
| 3,147,860 | A | * | 9/1964  | Kean, Sr. et al. | 206/448 |
| 3,596,755 | A |   | 8/1971  | Bundy et al.     |         |
| 3,809,234 | A | * | 5/1974  | Kurick           | 206/448 |
| 3,955,676 | A |   | 5/1976  | Hansen et al.    |         |
| 3,961,709 | A | * | 6/1976  | Rowley           | 206/448 |
| 3,995,738 | A |   | 12/1976 | Rowley et al.    |         |
| 4,010,848 | A |   | 3/1977  | Pater et al.     |         |

(Continued)

FOREIGN PATENT DOCUMENTS

WO WO 99/30598 6/1999

*Primary Examiner*—Luan K Bui
(74) *Attorney, Agent, or Firm*—Homer W. Faucett, III; Ice Miller LLP

(57) ABSTRACT

A fully collapsible pallet is provided with easily adjustable rear stops, lower rear stops, and side restraints. A telescoping member is provided to allow shipment of partial pallets of windshields. Extensions allow the pallet to be used with windshields of various heights. The pallet is stackable in a folded condition as well as a loaded condition, even when extensions are used. A latch is provided to prevent leaning of the pallet even when the load is not centered in the pallet.

4 Claims, 18 Drawing Sheets

U.S. PATENT DOCUMENTS

| | | | |
|---|---|---|---|
| 4,010,849 A | 3/1977 | Pater et al. | |
| 4,033,597 A | 7/1977 | Boyer | |
| 4,086,263 A | 4/1978 | Rowley | |
| 4,093,251 A | 6/1978 | Boyer | |
| 4,186,841 A * | 2/1980 | Buckley et al. | 220/6 |
| 4,202,452 A | 5/1980 | McCormick | |
| 4,465,413 A * | 8/1984 | Petren | 206/386 |
| 4,512,473 A | 4/1985 | Thomaswick et al. | |
| 4,778,064 A | 10/1988 | Gold | |
| 4,899,880 A | 2/1990 | Carter | |
| 5,145,073 A | 9/1992 | Kitagawa et al. | |
| 5,154,310 A | 10/1992 | Massey | |
| 5,465,883 A | 11/1995 | Woodward | |
| 5,603,419 A | 2/1997 | Peterson | |
| 5,641,076 A | 6/1997 | Englund | |
| 5,676,066 A | 10/1997 | Cavalier et al. | |
| 5,711,429 A | 1/1998 | Brown | |
| 5,755,339 A | 5/1998 | Belanger et al. | |
| 5,860,539 A | 1/1999 | Brown | |
| 5,884,778 A | 3/1999 | Freiheit | |
| 6,247,601 B1 | 6/2001 | Norton et al. | |
| 6,979,037 B2 * | 12/2005 | Morrison | 296/37.5 |
| 2003/0164318 A1 | 9/2003 | Lacasse et al. | |

* cited by examiner

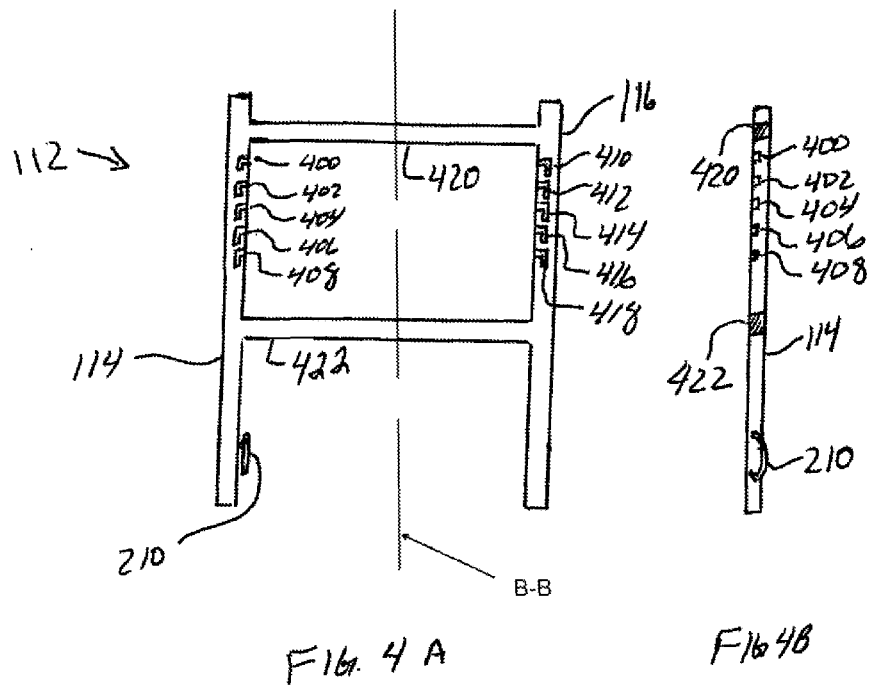
FIG. 4A  FIG. 4B
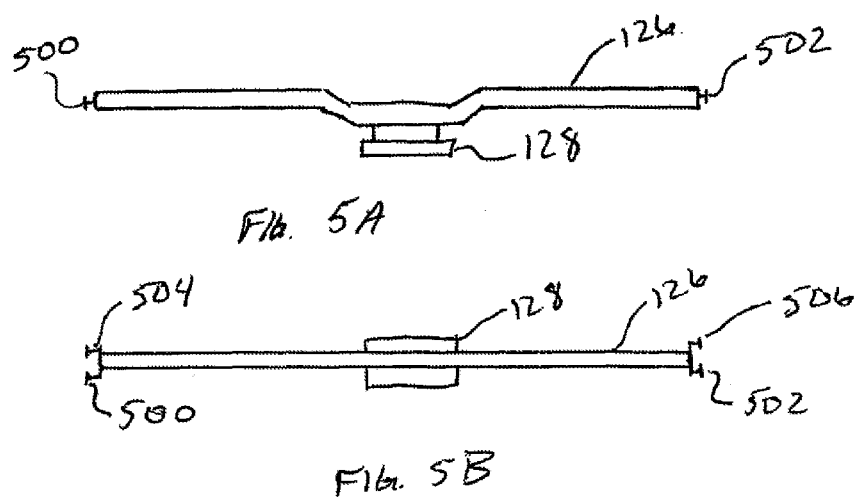
FIG. 5A
FIG. 5B

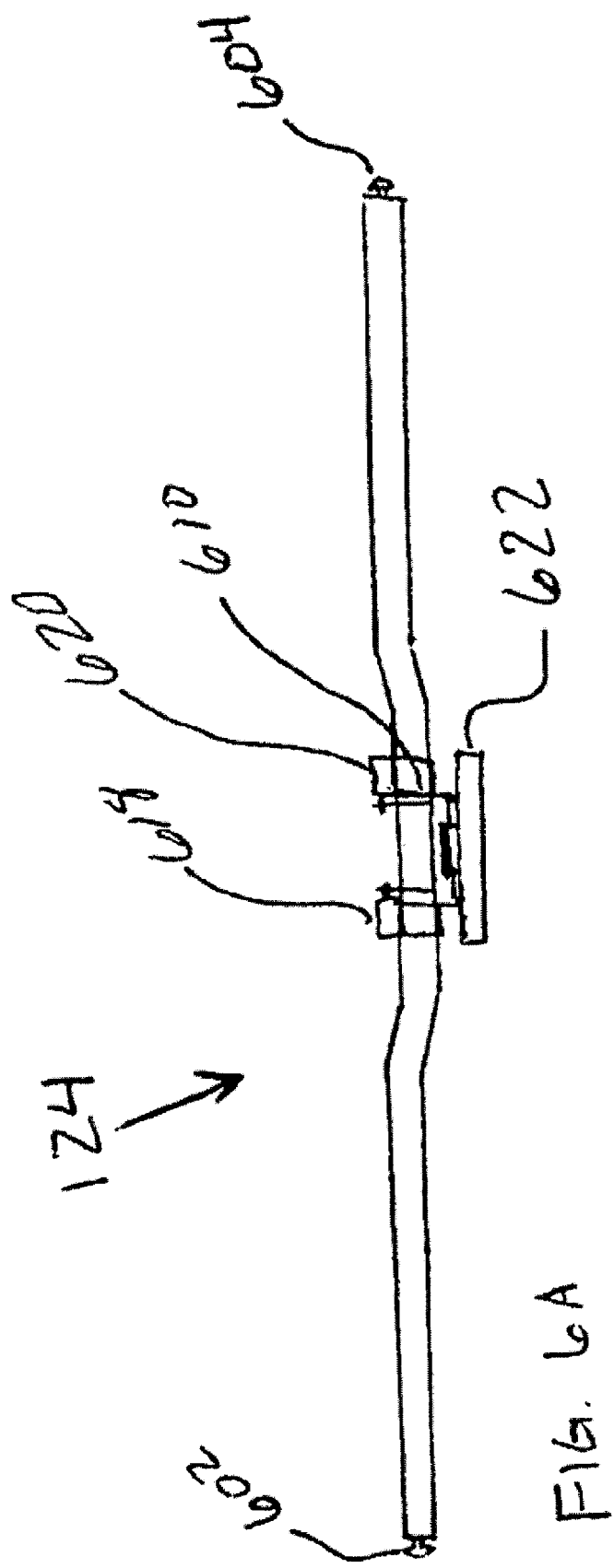

REUSABLE WINDSHIELD PALLET

This is application is a divisional application of U.S. patent application Ser. No. 10/759,944 filed Jan. 6, 2004, U.S. Pat. No. 7,270,236, which claimed priority to provisional application Ser. No. 60/442,719, filed on Jan. 27, 2003.

BACKGROUND OF THE INVENTION

This invention relates generally to collapsible pallet racks and more particularly to a collapsible and stackable pallet for shipping and storing breakable material.

Partially collapsible or foldable steel pallets are known for use in place of wood pallets in shipping heavy and awkward articles such as automobile windshields. Steel pallets are very durable, allowing for prolonged use. Moreover, partially collapsible pallets allow for reduced shipping volume, decreasing the cost of relocating empty pallets for reuse. Accordingly, it is known generally to use partially collapsible steel pallets to ship breakable goods, such as automobile windshields.

The shipment of breakable goods present unique challenges in the design of reusable pallets. For example, if a pane of glass is not properly secured within the pallet, unacceptable levels of breakage occur in shipment. Accordingly, it is known to use dunnage when shipping windshields. "Dunnage" is simply packing material which is added to the pallet so as to make the shipped material more secure. Of course, the addition of dunnage to the pallet takes time, and increases the potential for breakage when improperly performed. Moreover, the need for dunnage increases the cost of shipping. All of these problems are exacerbated when a partial pallet (a pallet that is not completely filled) is to be shipped.

It is also known to design a pallet so as to provide support at a plurality of locations when shipping a pane of glass. U.S. Pat. No. 5,154,310 to Massey is an example of this type of pallet. In accordance with the '310 patent, an end nestable stackable container is provided with a means to firmly contain material being shipped. Four point of contact are provided for the material to be shipped. The '310 patent accomplishes this by providing hold down arms which can be pivoted over the top of the material being shipped, so as to provide contact along the top edge of the material. Contact on two sides of the material being shipped is provided by a side stabilizing mechanism. The fourth point of contact is along the bottom of the material. The device disclosed in the '310 patent is useful when shipping empty pallets. However, because the pallet is only partially collapsible, allowing the empty pallets to be nested, the number of pallets which can be safely stacked before the stack starts to lean is limited.

The device disclosed in the '310 patent is also useful when shipping a number of panes which are of a uniform shape and size. However, in certain applications it would be advantageous to ship glass of differing shapes and sizes within a single pallet. For example, the secondary windshield market provides replacement windshields for all makes and models of vehicles. It is impractical for retail stores to maintain a supply of every shape and size windshield for every make and model of vehicle. Thus, the secondary windshield market has evolved into a make to order market. In a make to order market, when a windshield of a particular size is needed, an order is placed to a manufacturing facility. The facility then manufactures a replacement windshield. The replacement windshield is next packaged, along with other windshields, and transported to a distribution center, for eventual shipment to the location which placed the initial order.

Obviously, a number of alternative distribution models exist. For example, certain sized windshields may be so commonly required as replacements that a certain level of inventory is desired at the distribution center. Alternatively, more or fewer distribution points may be included in a particular distribution model. Regardless of the model, however, it is advantageous to be able to place windshields of various sizes and shapes on a single pallet. The presence of windshields of non-uniform shape or size on a single pallet is called a "mixed pallet." Use of a mixed pallet allows for optimization of the use of pallet volume when shipping windshields, so that fewer pallets are required. As the number of pallets is reduced for a given number of windshields, the overall required shipping volume and weight is reduced. When using steel pallets, the reduced weight can be significant. Of course, the reduced number of pallets also results in cost savings when returning the pallets to the manufacturing facility for reuse.

The shipment of full pallets, mixed pallets or partial pallets of windshields present a number of additional challenges. This is due, in part, because windshields are not of a uniform shape or size. Typical variation in windshield shape and size is discussed with reference to FIGS. 12-14. FIG. 12 is a perspective view of a windshield. As shown in FIG. 12, windshield 1200 is curved from corner 1202 to corner 1204. Windshield 1200 is also curved between upper midpoint 1206 and lower midpoint 1208. This is shown more clearly in FIG. 14 which is discussed below.

Referring now to FIG. 13, a front view of windshield 1200 is shown. Also shown in FIG. 13 is a front view of windshield 1210, which is located behind windshield 1200. As is clear from FIG. 13, windshield 1200 is both longer and taller than windshield 1210.

FIG. 14 is a side view of windshield 1200 and windshield 1210 in a substantially upright position. Front face 1212 (outside when installed in a vehicle) of windshield 1200 and front face 1214 of windshield 1210 are curved. Additionally, windshield 1200 and windshield 1210 are curved from end to end. This is shown in FIG. 15, which is a top plan view of windshield 1200 and windshield 1210.

Thus, ear 1216 and ear 1218 of windshield 1210 are located behind the midpoint of the rear face of windshield 1210, which is shown in FIG. 14 as dashed line 1230. Similarly, ear 1218 and ear 1220 of windshield 1200 are located behind the midpoint of the rear face of windshield 1200, which is shown in FIG. 14 as dashed line 1232. As is apparent from FIG. 14, ear 1220 of windshield 1200 extends farther back from dashed line 1232 than ear 1216 of windshield 1210 extends back from dashed line 1230.

Since it is desirable to maintain all of the windshield within the protective box or envelope defined by the outer boundaries of the pallet to minimize breakage, and since windshields are typically shipped in a generally upright position, a pallet used to ship windshields of multiple heights must be high enough to enclose the tallest windshield to be shipped. Obviously, when shipping shorter windshields, this results in a pallet of unnecessary weight and volume, increasing shipping costs.

Moreover, in order to ensure the ears of the windshield (the outermost ends) are maintained within the envelope of the pallet, it is known to use a stop. A "stop", as used herein, is an object that protrudes into the pallet envelope to maintain spacing between the windshield and the end of the pallet. The stop protrudes into the pallet and contacts the rear face of the windshield. Because windshields are of varying curvature and length, the distance the stop must protrude into the envelope of the pallet varies. Obviously, sizing the stops to ensure the windshields of greatest curvature and length are maintained within the envelope of the pallet results in wasted space when windshields of lesser curvature and length are shipped. This decrease in shipping density of the pallet, can result in more pallets being required to ship a given number of windshields. While some present art systems allow for adjustable stops, these systems include a number of moving parts, and take a significant amount of time to adjust.

Another problem caused by the curvature of windshields is that the center of gravity of the pallet will not be the volumetric center of the pallet. Therefore, when the windshields are secured within a pallet, a torque is created. This is typically not a problem when a single pallet is considered, or when the pallet is not collapsible. However, when stacking collapsible pallets wherein an upright post is inserted into a holder, the torque will tend to unseat the post from the holder. Thus, stacked pallets can develop a lean.

An additional problem is presented because of the varying lengths of present day windshields. Typically, a restraint is incorporated on each side of a pallet to maintain loaded windshields within the envelope of the pallet. A "restraint", as used herein, is an object that maintains a windshield within the envelope of the pallet at the sides of the pallet. Positioning the restraints to allow for the shipment of the longest windshield expected to be shipped, results in an undesirably large lateral area within which a windshield is allowed to move before being laterally constrained. Although it is known to provide adjustable lateral restraints, these restraints include a number of parts which can be misplaced and/or are time consuming to adjust.

It is desirable, therefore, to provide a device which allows for shipment of vehicle replacement glass of non-uniform shape and/or size while minimizing breakage of the glass in shipping. It is further desired that the device minimize the required amount of dunnage, and be simple to use. Moreover, it is desired that the device be of simple, lightweight and inexpensive construction. It is desired that the pallet be stackable even when empty and collapsed. It is also desired to have a shipping pallet that is versatile enough to ship tall windshields without wasting weight and volume when shipping short windshields. It is further desirable to provide stops which use a minimum number of parts and which can be quickly and easily changed to the proper distance of protrusion into the pallet. Moreover, it is desired to have a collapsible pallet that will not lean when stacked. Additionally, it is desired to provide a restraint which is quickly and easily repositioned to a lateral position dictated by the longest windshield in the pallet being shipped.

BRIEF SUMMARY OF THE INVENTION

In accordance with the present invention, a reusable pallet is provided which overcomes the disadvantages of the prior art by providing a collapsible pallet which requires a minimum amount of dunnage in order to ship even mixed pallets of vehicle glass. In one embodiment, a rear support bar that is adjustable to various heights is provided with a plurality of resilient stops to serve as a means for adapting the pallet to secure a variety of windshields based upon the windshields to be shipped. The resilient stops of the rear support bar can work in a complimentary manner with other means for adapting the pallet to secure a variety of windshields such as lower resilient stops to provide upper and lower stops at the concave side of the rearmost windshield in the pallet. The lower resilient stops in one embodiment comprise a plurality of protuberances, each protuberance located at a different distance from the end of the lower stop so that windshields of varying curvature are readily accommodated.

Another means for adapting the pallet to secure a variety of windshields is provided in the form of side restraints that maintain the ends of windshields within the envelope of the pallet. The side restraints are quickly and easily adjustable to conform to windshields of varying length. In one embodiment, the side restraints use a ratchet and pawl mechanism to ease adjustment of the position of the restraints.

A pallet according to the present invention may be constructed to have a height compatible with shipping windshields of a nominal height. Extensions and a telescoping strap guide are provided as a to secure a variety of windshields the pallet to be used with windshields of greater height, while maintaining the windshields within the pallet envelope and without putting additional stress on the edge of the windshield. The telescoping strap guide also allows the pallet to be adapted to ship partial pallets.

The pallet may be made collapsible by providing corner stubs with an upper portion designed to receive four corner posts in a normal configuration. The upper portion of the corner stubs are further designed to receive the lower portion of the corner stubs of a second pallet. Thus, the pallet is stackable while in a collapsed configuration. The lower portion of the corner stubs are designed to receive the upper portion of the four corner posts, or extensions, of a second pallet. Thus the pallet is stackable in a normal configuration and an extended configuration. In one embodiment, two latches are provided to secure two of the corner posts with two of the corner stubs to eliminate leaning of the pallet when loaded.

BRIEF DESCRIPTION OF THE DRAWINGS

FIG. 4A is a side plan view of a side frame of the pallet of FIG. 1.

FIG. 4B is a end cross-sectional view of the side frame of FIG. 4A taken along line B-B in FIG. 4A.

FIG. 5A is a top plan view of a front support bar.

FIG. 5B is a rear plan view of the front support bar of FIG. 5A.

FIG. 6A is a top plan view of a rear support bar.

DETAILED DESCRIPTION OF THE INVENTION

Figure 1:
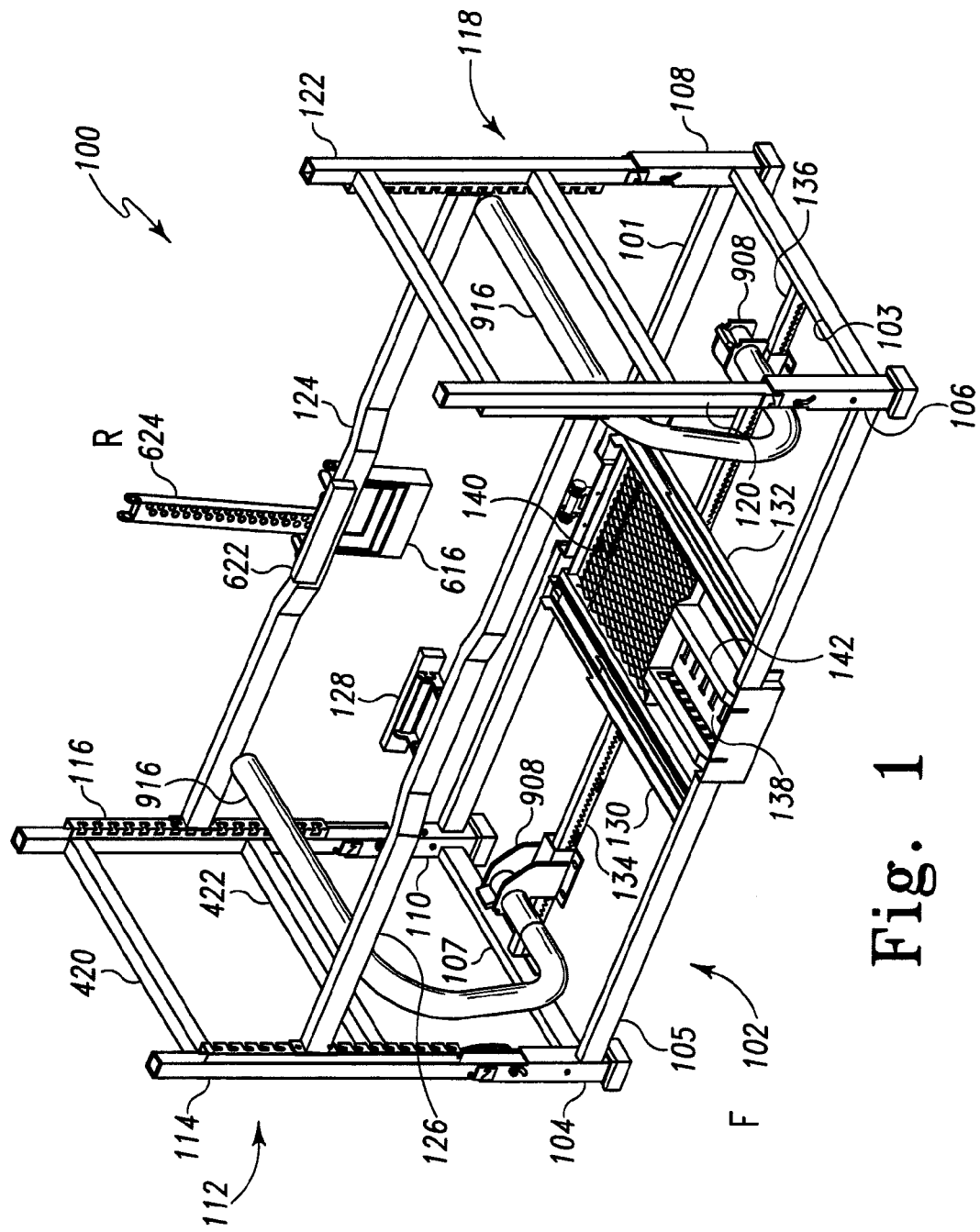
FIG. 1 is a perspective view of one embodiment of a pallet in accordance with the present invention.

Referring to FIG. 1, one embodiment of the present invention is described. Pallet 100 comprises frame 102. The front of pallet 100 is indicated by reference letter F. The rear of pallet 100 is indicated by reference letter R. Frame 102 comprises bars 101, 103, 105 and 107, arranged in a substantially rectangular configuration. Stubs 104, 106, 108 and 110 are attached to frame 102 at the corners defined by bars 101, 103, 105 and 107. In this embodiment, stub 104 is welded to bar 105 and bar 107, stub 106 is welded to bar 103 and bar 105, stub 108 is welded to bar 101 and bar 103, and stub 110 is welded to bar 101 and bar 107.

Side frame 112 comprises post 114 and post 116. Post 114 and post 116 are engaged with stubs 104 and 110 respectively. Thus, post 114 and post 116 are the upper sections of rigid members extending from frame 102, and stubs 104 and 110 are the lower sections of rigid members extending from frame 102. Side frame 118 comprises posts 120 and 122. Posts 120 and 122 are similarly engaged with stubs 106 and 108 respectively so as to provide rigid members extending from frame 102. Rear support bar 124 is removably attached to post 116 and post 122. Front support bar 126, comprising front stop 128, is removably attached to post 114 and post 120.

Pallet 100 further comprises longitudinal members 130 and 132, each of which are welded to bars 101 and 105. Transverse members 134 and 136 are connected between longitudinal member 130 and 132, respectively, and frame 102 of pallet 100. Specifically, transverse member 134 is welded to bar 107 and longitudinal member 130, and transverse member 136 is welded to bar 103 and longitudinal member 132. Alternative longitudinal and transverse members are discussed more fully below. Locking bar 138 is located at the forward end of pallet 100 between longitudinal members 130 and 132. Rack 140 is provided at the rear of pallet 100 and lower front stop 142 is located on the front of frame 102.

Figure 2:
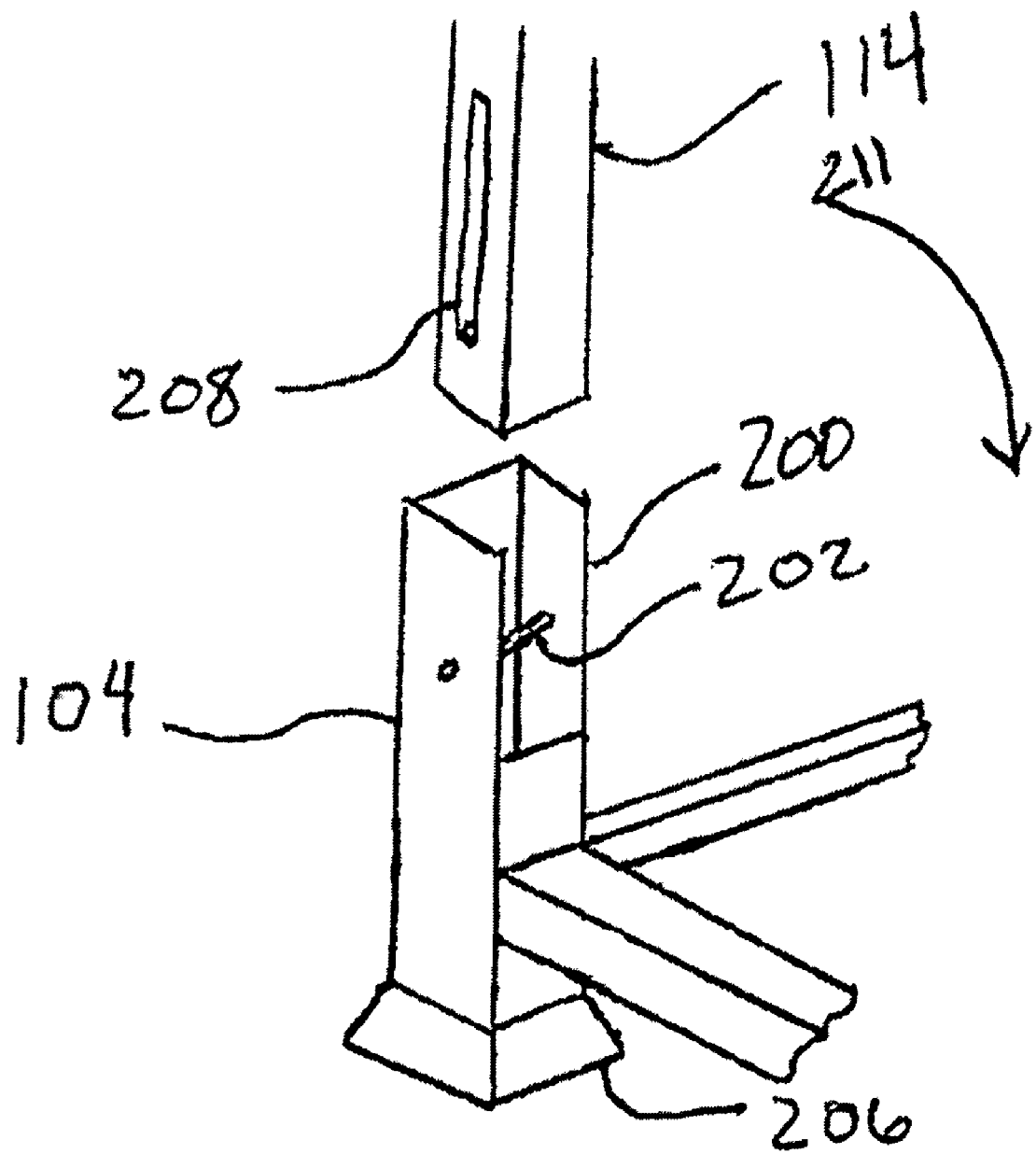
FIG. 2 is a perspective fragmentary view showing a disassembled stub and post of the pallet of FIG. 1.

Referring now to FIG. 2, the mechanism allowing side frame 112 and side frame 118 to be collapsed or folded is described. FIG. 2 is a perspective view showing stub 104 and post 114 disassembled. Stub 104 comprises slot 200 and pin 202. Flared end 206 of stub 104 allows for stacking of pallet 100 as it is sized to receive the upper end of a stub on a second pallet, the upper end of a post on a second pallet, and the upper end of an extension, as discussed below. Post 114 includes slot 208.

When fully assembled, pin 202 is located within slot 208 and the portion of post 114 below slot 208 is located within stub 104. Thus, when post 114 is fully inserted into stub 104, pin 202 abuts the top of slot 208. From the fully inserted position, post 114 may be raised such that pin 202 abuts the bottom of slot 208. With post 114 so raised, post 114 may be rotated in the direction of arrow 211, so as to lie substantially in the plane of frame 102. Conversely, if post 114 is laying substantially in the plane of frame 102, post 114 can be rotated in the direction opposite arrow 211 into an upright position. Once in an upright position, post 114 may be lowered straight down into stub 104 as slot 208 slides past pin 202, until pin 202 abuts the top of slot 208. A similar pin and slot arrangement is used for post 116 and stub 110. Side frame 118 has a similar configuration.

Figure 3:
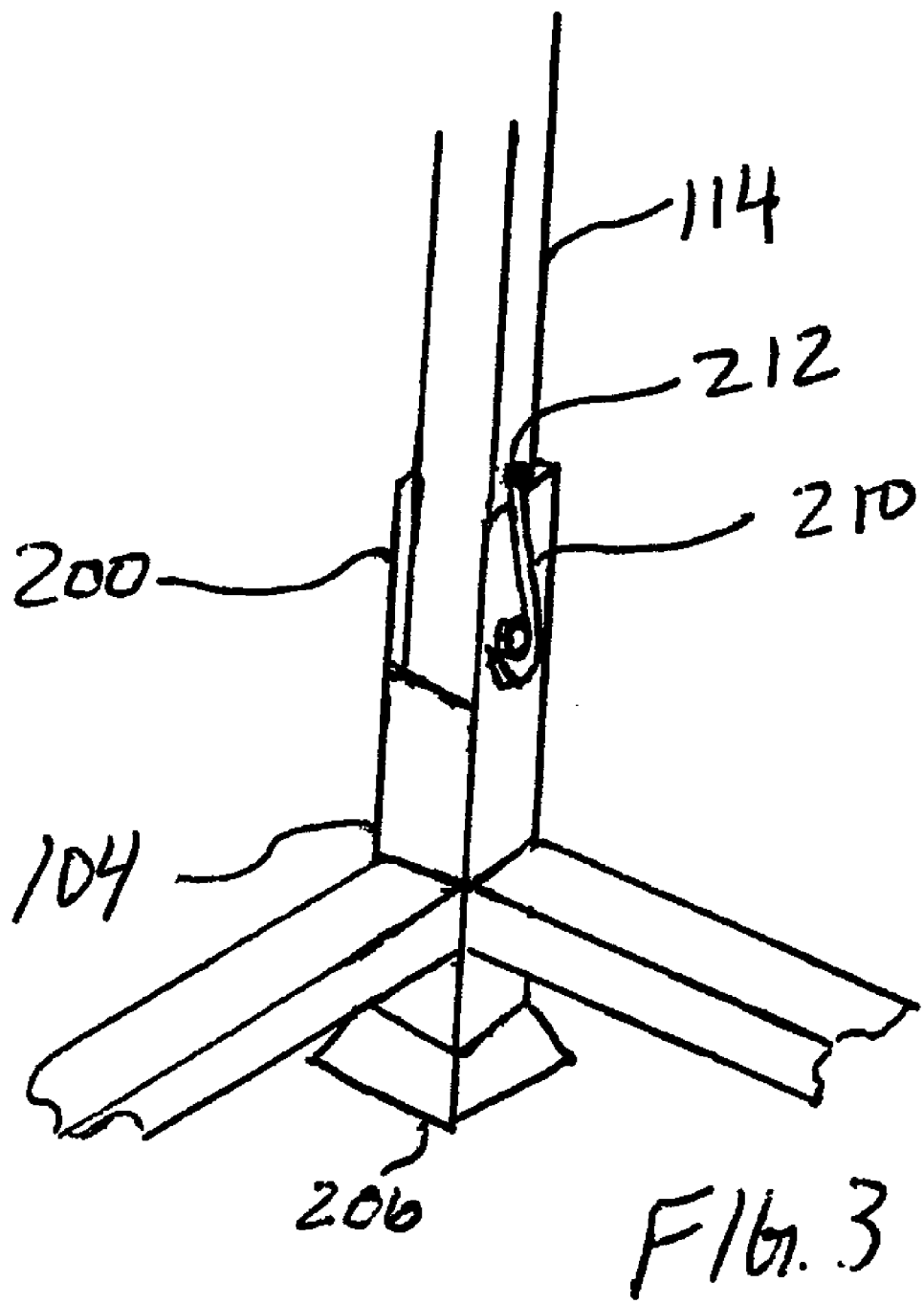
FIG. 3 is a perspective fragmentary view of the stub and post of FIG. 2 in an assembled configuration.

Referring now to FIG. 3, post 114 is shown fully inserted into stub 104. Also shown in this figure is a means for maintaining post 114 in a fixed relationship with stub 104. Latch 210 is pivotably connected to post 114 at pivot 212. In this embodiment, pin 202 protrudes beyond the wall of stub 104. Thus, when post 114 is inserted into stub 104, latch 210 of post 114 engages the protruding portion of pin 202. Thus, post 114 cannot be moved in an upward direction without first disengaging latch 210 from pin 202. A similar arrangement is provided on stub 106 and post 120. Thus, when windshields are loaded onto pallet 100, any torque generated by the load will not cause post 114 or post 120 to rise within stubs 104 or 106 respectively. The posts and stubs are thus maintained in a fixed relationship until the latch and pin mechanism is disengaged. Of course, the latch may alternatively be mounted on the stubs. In this configuration, it may be desired to use a biasing means such as a spring to maintain the latch in a generally upright (engaged) position.

Referring now to FIG. 4A, an inside plan view of side frame 112 is shown. For purposes of discussion, side frame 112 is shown disassembled from stub 104 and stub 110. From this view, slots 400, 402, 404, 406 and 408 of post 114 are visible. Also shown are slots 410, 412, 414, 416 and 418 of post 116. Member 420 and member 422 connect post 114 and post 116. FIG. 4B shows an plan view of post 114 looking from the rear of pallet 100.

FIG. 5A and FIG. 5B show views of front support bar 126. Referring to FIG. 5A, which is a bottom plan view of front support bar 126, front stop 128 and pins 500 and 502 are shown. Shown on FIG. 5B, which is a rear plan view of front support bar 126, pins 504 and 506 are shown. Pins 500, 502, 504 and 506, in conjunction with slots 400, 402, 404, 406 and 408, and similar slots on post 120, allow front support bar 126 to be positioned as a cross bar between post 120 and post 114 at a plurality of heights. For example, if it is desired to locate front support bar at a high position, pin 504 may be inserted into slot 400, and pin 500 may be inserted into slot 402. If a lower position is desired, pin 504 may be inserted into slot 404, and pin 500 may be inserted into slot 406. The insertion of two pins in each post provides for added stability.

Front support bar 126 is used when pallet 100 is fully loaded with windshields. The height is selected such that when pallet 100 is loaded and front support bar 126 is installed, front stop 128 is abutted against the convex side of the foremost windshield.

Figure 6B:
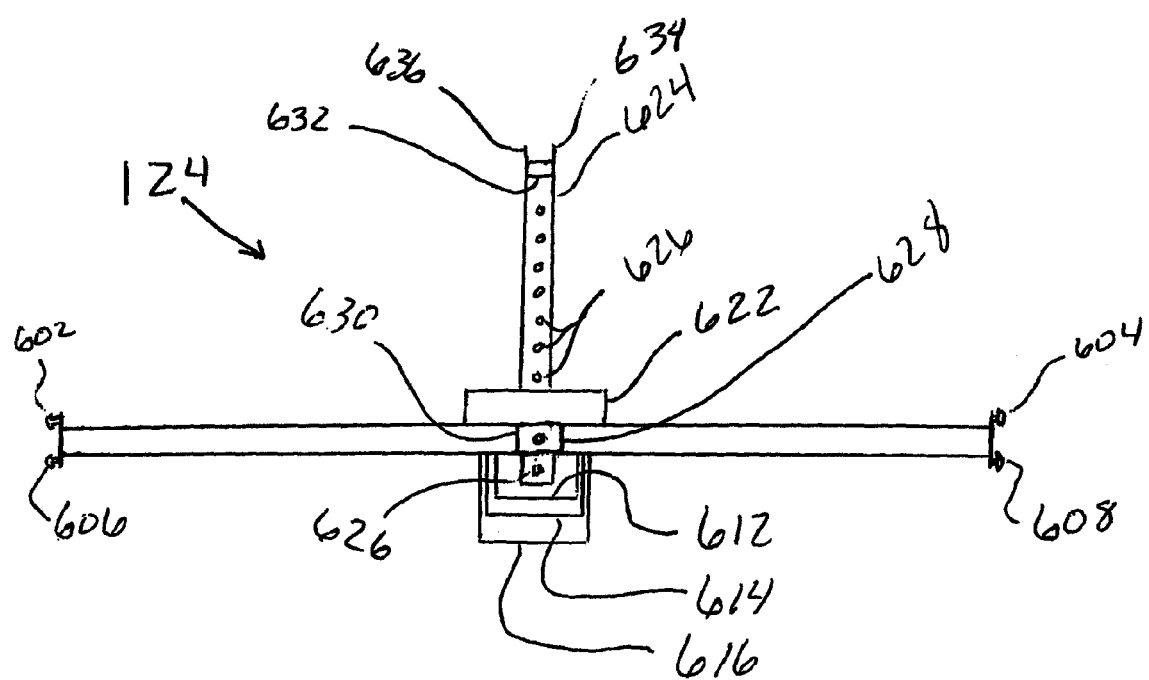
FIG. 6B is a rear plan view of the rear support bar of FIG. 6A.

FIG. 6A and FIG. 6B show views of rear support bar 124. In this embodiment, rear support bar 124 comprises pins 602, 604, 606 and 608 which, in conjunction with slots 410, 412, 414, 416 and 418, and similar slots on post 122, allow rear support bar 124 to be positioned as a cross bar between post 122 and post 116 at a plurality of heights.

Rear support bar 124 further comprises stops 610, 612, 614 and 616. Stops 610, 612, 614 and 616 are rotatably mounted to rear support bar 124 at hinge 618 and 620. FIG. 6A shows stop 610 rotated over the top of rear support bar 124. According to one embodiment, a detent pin is used to maintain a stop in position over the top of rear support bar 124.

Each of stops 610, 612, 614 and 616 have a different radius as measured from where they are connected to hinges 618 and 620 to the point of stops 610, 612, 614 and 616 farthest from hinges 618 and 620. Thus, when rotated above rear support bar 124, each of stops 610, 612, 614 and 616 protrude into pallet 100 to different extents.

The stop to be used is determined based upon the curvature of the windshield. The purpose of the rear stops is to maintain the ears of the windshield within the box defined by the upright rigid members of pallet 100. However, as the radius of the stop used increases, fewer windshields may be loaded on pallet 100 since the rearmost windshield is pushed farther forward by stops of greater radius. Thus, it is normally desired to use the stop with the smallest radius that still maintains the ears of the windshields within the box defined by the upright rigid members of pallet 100. Accordingly, stop 610, which has the smallest radius, is used with relatively straight windshields. As the curvature of the windshields to be loaded increases, stops of greater radius are used to ensure the ears of the windshields are still maintained within the box defined by the upright rigid members of pallet 100. Rear support bar 124 and stops 610, 612, 614 and 616 thus provide means for adapting pallet 100 to secure a variety of windshields based upon windshields to be shipped when the windshields are of varying shapes and sizes.

Continuing with FIGS. 6A and 6B, resilient pad 622 is attached to stop 610. In this embodiment, a single resilient pad is removably connectable to the stops. Alternatively, each stop may be provided with a resilient pad. Rear support bar 124, in this embodiment, further comprises telescoping member 624. Telescoping member 624 comprises a plurality of holes 626. Detent pin 628 protrudes through a hole in strap 630 into one of the plurality of hole 626 to maintain telescoping member 624 at a desired height. The upper section of telescoping member 624 includes rounded channel area 632 which is bounded by fins 634 and 636. Fins 634 and 636 are used to maintain a strap (not shown) on rounded channel area 632 when telescoping member 624 is used with a partial pallet as is explained in more detail below.

Those of skill in the art will appreciate that a number of alternative embodiments are within the scope of the present invention. By way of example, but not of limitation, more or fewer stops may be provided. Additionally, while the embodiment of FIGS. 6A and 6B comprises a single resilient pad which is used interchangeably with any of stops 610, 612, 614 or 616, it may be desired to provide resilient pads dedicated to a single stop or a group of stops. Moreover, the pad and/or mounting area of the stop may be curved to provide additional contact area between the selected stop and the rearmost windshield. Additionally, the stops may be connected to a fixed bar, and/or a horizontal member. These alternatives and others being within the scope of the present invention.

Figure 7A:
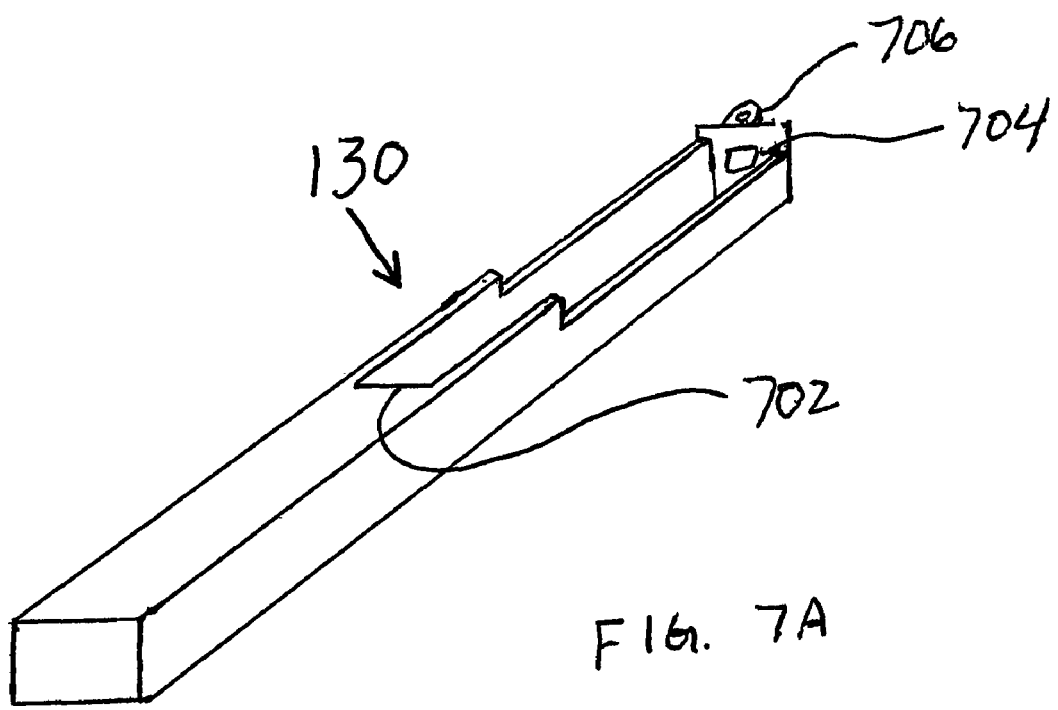
FIG. 7A is a perspective view of a longitudinal member of the pallet of FIG. 1.
Figure 7B:
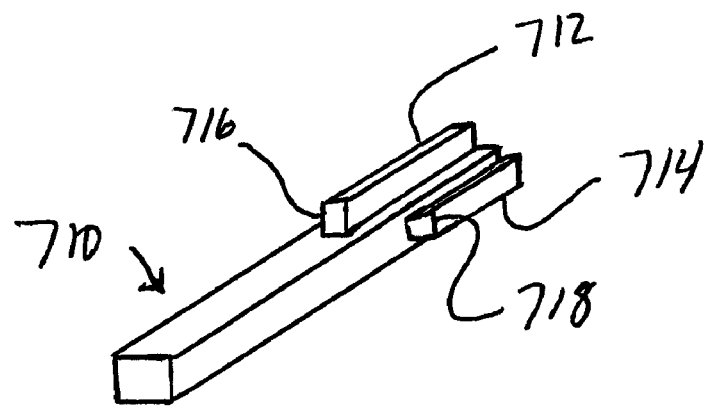
FIG. 7B is a perspective view of an insert for the longitudinal member of FIG. 7A.
Figure 7C:
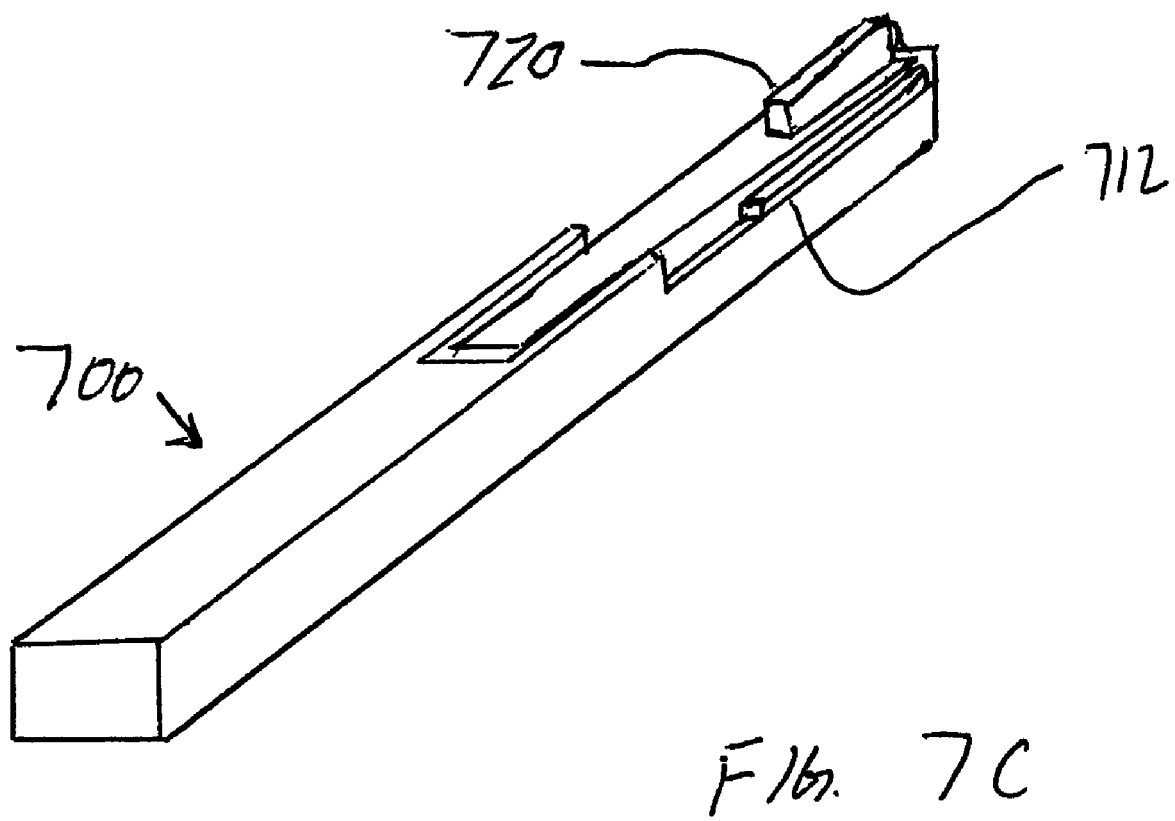
FIG. 7C is a perspective view of the insert of FIG. 7B in the longitudinal member of FIG. 7A.

Referring now to FIGS. 7A, 7B and 7C, additional detail of longitudinal member 130 is shown. Longitudinal member 130 comprises channel 702, hole 704 and tab 706. With reference to FIG. 7B, insert 710 comprises protuberance 712, protuberance 714, protuberance 720 (see FIG. 7C) and an additional protuberance (not shown) on the fourth side of insert 710. Protuberance 712 and protuberance 714 comprise front side 716 and 718 respectively. As shown in FIG. 7C, insert 710 fits within channel 702. In FIG. 7C, insert 710 has been rotated ninety degrees from the position of insert 710 in FIG. 7B. Thus, protuberance 714 is on the bottom of insert 710 as channel 702 is sized to receive protuberance 714, as well as protuberance 712 and 720. Insert 710 is maintained in position within channel 702 by a cotter pin which is inserted through the hole in tab 706 and through a tab (not shown) provided on the end of insert 710 which protrudes through hole 704 of longitudinal member 130 when insert 710 is inserted into channel 702.

Each protuberance rises above the plane of longitudinal member 130 when placed in an upright position. Thus, the concave side of a windshield loaded into pallet 100 will abut the front side of the protuberance rising above the plane of longitudinal member 130. Because the protuberances each have a front side rising out of insert 710 at a different distance from the end of insert 710, and because insert 710 may be rotated and placed within channel 702 such that any protuberance is in the upright position, it is possible to control the rearmost location of the bottom of a windshield loaded into pallet 100. Insert 710 thus serves as a means for adapting pallet 100 to secure a variety of windshields based upon windshields to be shipped when the windshields are of varying shapes and sizes. Thus, in this embodiment, in combination with the selection of the rear stop as discussed above with reference to FIGS. 6A and 6B, it is possible to maximize the loading of the pallet, while ensuring that the ears of the loaded windshields are maintained within the box defined by the upright rigid members of pallet 100.

Longitudinal member 130 in this embodiment comprises a wood base with a urethane overlay. This construction allows for reuse while minimizing expense. Moreover, construction from these materials has been found to reduce the amount of breakage as compared to other materials. Those of skill in the art will appreciate that other alternative materials may be used. Moreover, although the embodiment of FIG. 1 comprises two lower stops, one on each longitudinal member, more or fewer lower stops may be used. Additionally, the inserts and protuberances may be of various shapes, and more or fewer protuberances may be used. These variations and others are within scope of the present invention.

Figure 8:
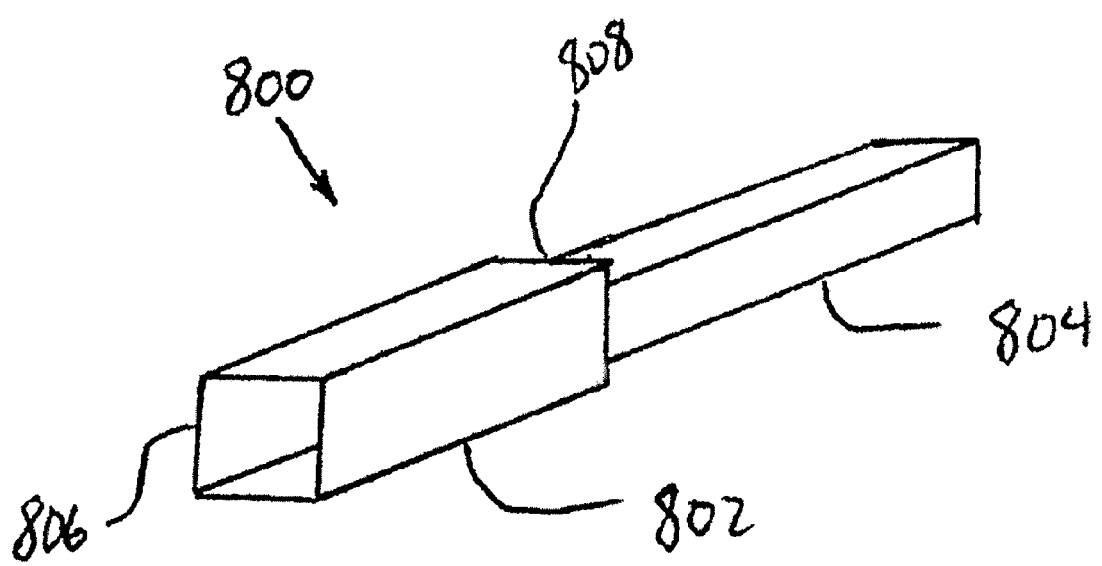
FIG. 8 is a perspective view of an extension.

Referring now to FIG. 8, an extension is shown. Extension 800 comprises lower section 802 and upper section 804. Lower section 802 includes opening 806. Lower section 802 is connected to upper section 804 at shoulder 808. In practice, four extensions are provided, one for use with each upwardly rigid member of a pallet as discussed below.

Opening 806 is sized so as to receive the upper end of post 114. However, shoulder 808 has an inside diameter that is smaller than upper end of post 114. Accordingly, when inserted onto post 114, post 114 penetrates lower section 802 until post 114 abuts shoulder 808. Upper section 804 is sized so as to be insertable into flared end 206 of stub 104. Thus, when four extensions are inserted onto four posts of a pallet, a second pallet may be placed on top of the first pallet by inserting the flared ends of the stubs of the second pallet onto the upper sections of the four extensions.

By placing extensions on post 114, 116, 122 and 120, the protective envelope of pallet 100 is extended to accommodate windshields of greater height. Extension 800 thus provides a means for adapting pallet 100 to secure a variety of windshields based upon windshields to be shipped when the windshields are of a height that would extend above posts 114, 116, 122 and 120.

Those of skill in the art will appreciate that a number of alternative embodiments of extensions exist. By way of example, but not of limitation, it is possible to design the posts and extensions such that the posts are inserted into the lower section of the extensions. Additionally, the upper section of the extension may be solid, and/or a portion of the lower section of the extension may be solid. Moreover, a variety of shapes may be used in place of the generally rectangular embodiments discussed herein. These variations and others are within the scope of the present invention.

Figure 9:
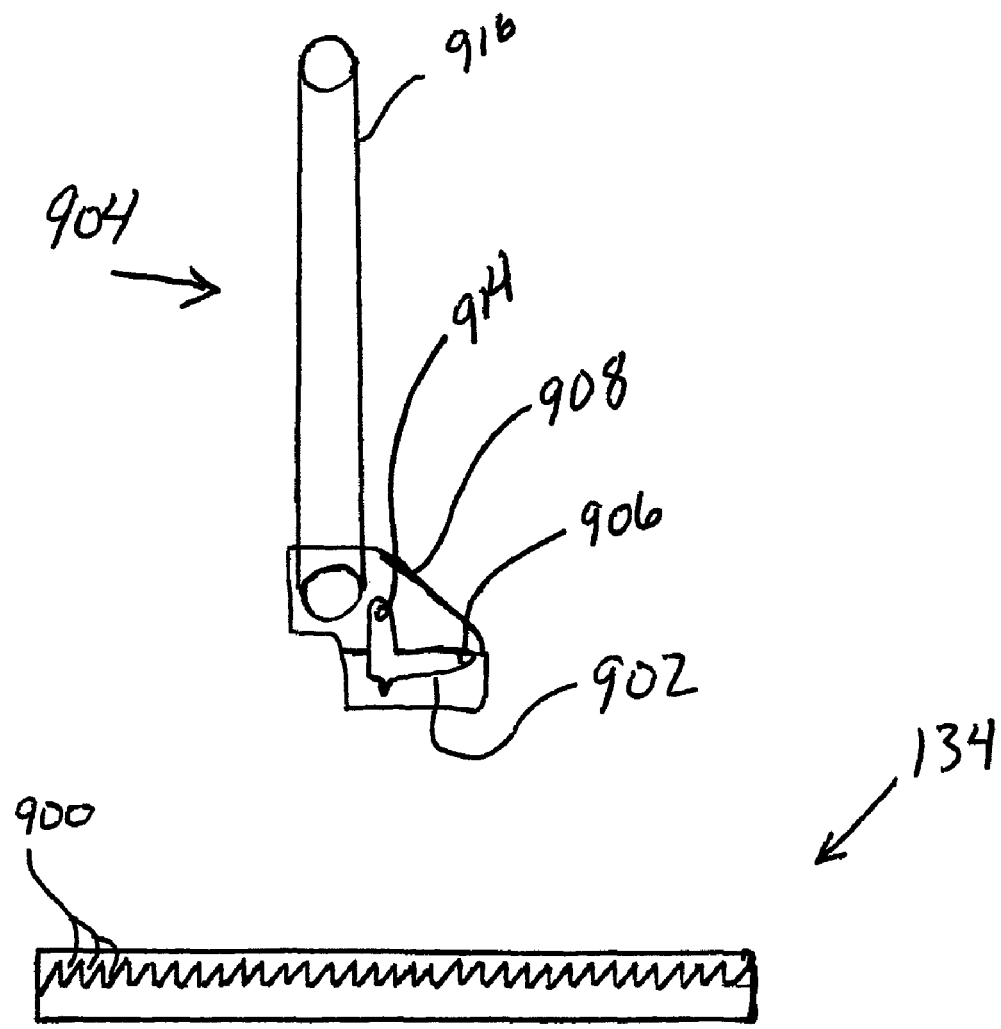
FIG. 9 is a side plan view of a transverse member of the pallet of FIG. 1 and a partial cutaway view of a side restraint.

Referring now to FIG. 9, a side plan view of transverse member 134 of FIG. 1 and a partial cutaway view of a side restraint are shown. Transverse member 134 comprises ratchet notches 900. Ratchet notches 900, in this embodiment, are located on both sides of transverse member 134, although only one side is shown. Ratchet notches 900 are sized to receive pawl 902 of side restraint 904. When pawl 902 is engaged with ratchet notches 900, side restraint 904 is allowed to be moved toward the center of pallet 100 (to the right as shown in FIG. 9), but pawl 902 does not allow movement away from the center of pallet 100.

Pawl 902 includes hole 914 which is used to release pawl 902 from ratchet notches 900 to allow movement away from the center of pallet 100. For example, a cable may be attached to pawl 902 at hole 914. Pulling the cable then disengages pawl 902 from ratchet notches 900. Pawl 902 is pivotably attached to housing 908 of side restraint 904 at rivet 906. Side restraint 904 also includes arm 916. In this embodiment, arm 916 is constructed of a solid material, and coated with a resilient material.

Figure 10:
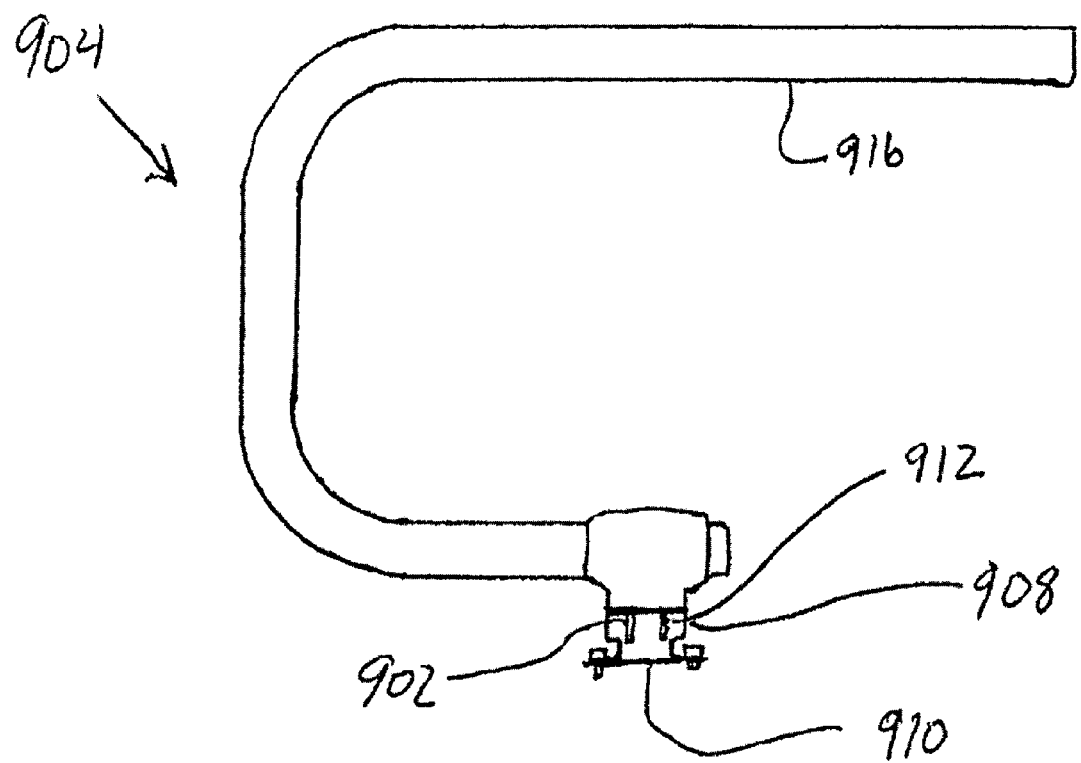
FIG. 10 is a plan view of the side restraint of FIG. 9.

As shown in FIG. 10, housing 908 is hollow, and is sized to hold transverse member 134. Side restraint 904 is attached to transverse member 134 by first removing bottom plate 910. Side restraint 904 is then placed on transverse member 134, with pawl 902 engaging ratchet notches 900 and pawl 912 engaging ratchet notches on the side of transverse member 134 opposite the side including ratchet notches 900. Bottom plate 910 is then reattached, entrapping transverse member 134 within housing 908.

Figure 11:
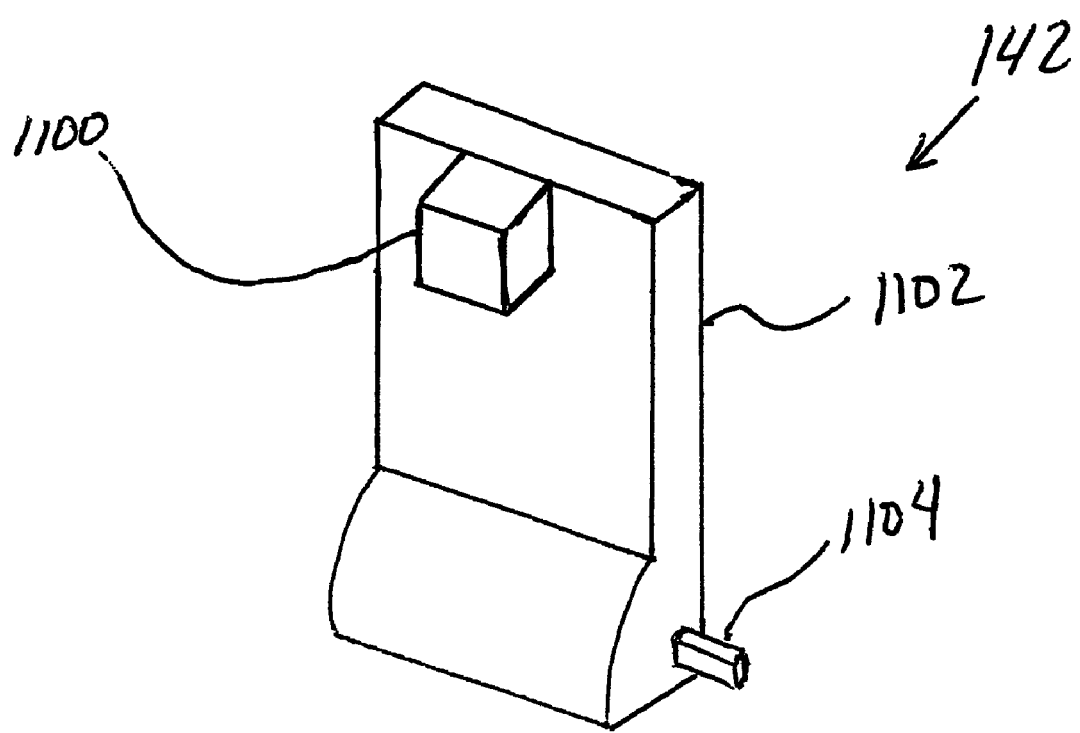
FIG. 11 is a perspective view of the lower front stop of the pallet of FIG. 1.
Figure 12:
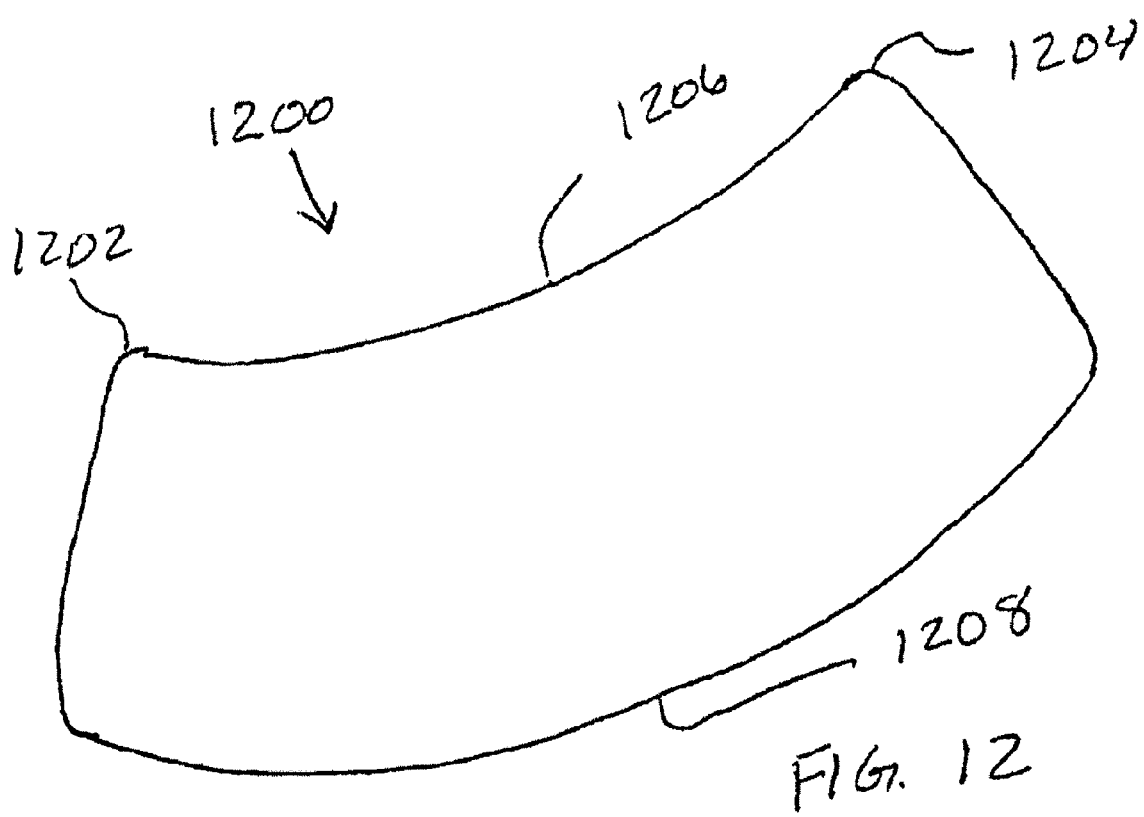
FIG. 12 is a perspective view of a windshield.
Figure 13:
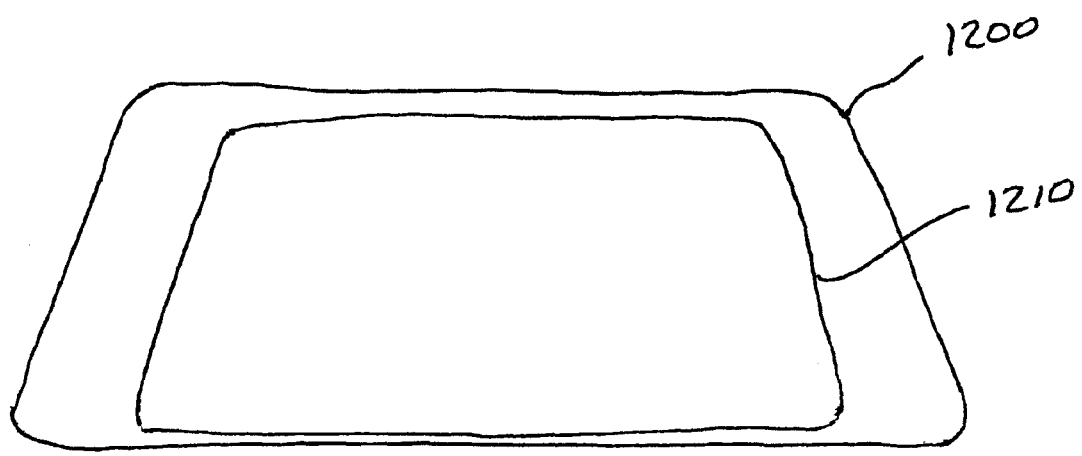
FIG. 13 is a front view of the windshield of FIG. 12 and a second windshield.
Figure 14:
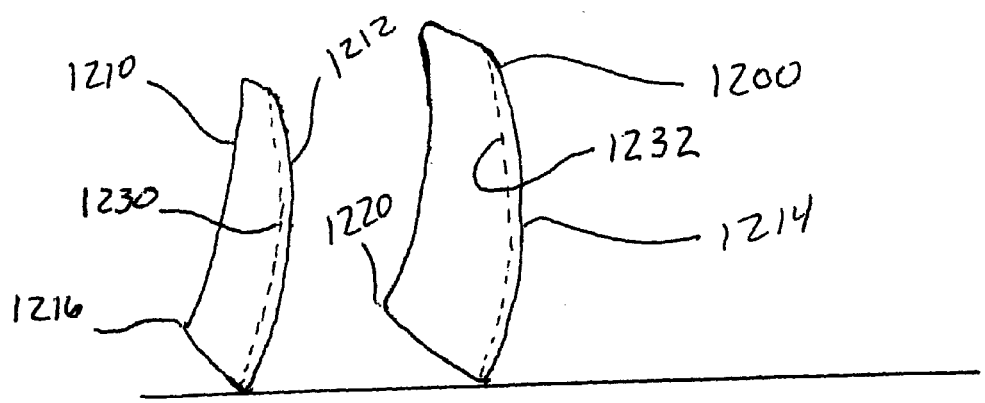
FIG. 14 is a side view of the windshields of FIG. 13.
Figure 15:
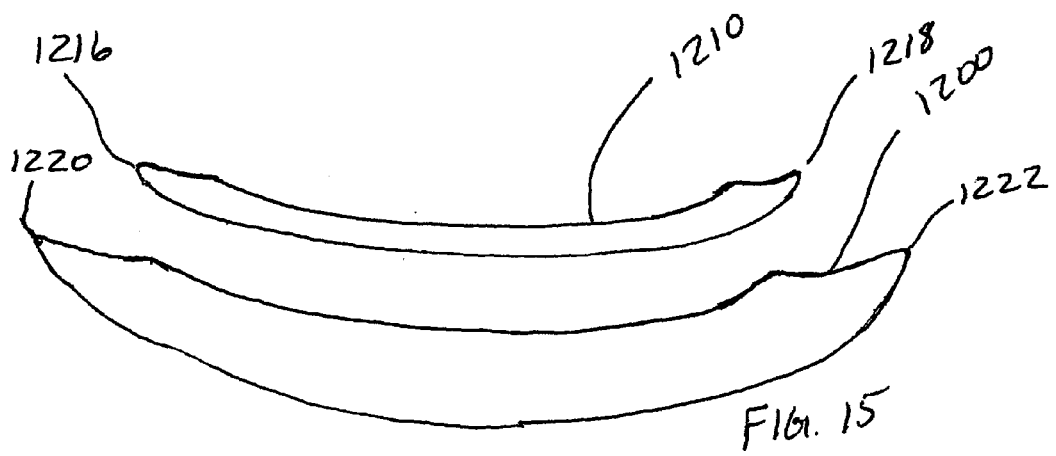
FIG. 15 is a top plan view of the windshields of FIG. 13.

FIG. 11 shows details of lower front stop 142. Lower front stop 142 comprises resilient pad 1100, stop 1102 and pivot 1104. Lower front stop is pivotably attached to the front of frame 102, such that when in an upright position as shown in FIG. 11, resilient pad 1100 is facing to the rear of pallet 100.

With reference to the preceding description, loading and unloading of a pallet constructed in accordance with the present invention is now described. Of course, the descriptions of operations are provided to aid in understanding various embodiments of the invention, and do not limit the scope of the invention in any way. Pallet 100 begins in a stowed configuration with side frames 112 and 118 lying on, or nearly on, frame 102. Additionally, rear support bar 124, front support bar 126, and the side restraints are disconnected, and preferably stored in rack 140.

Figure 17:
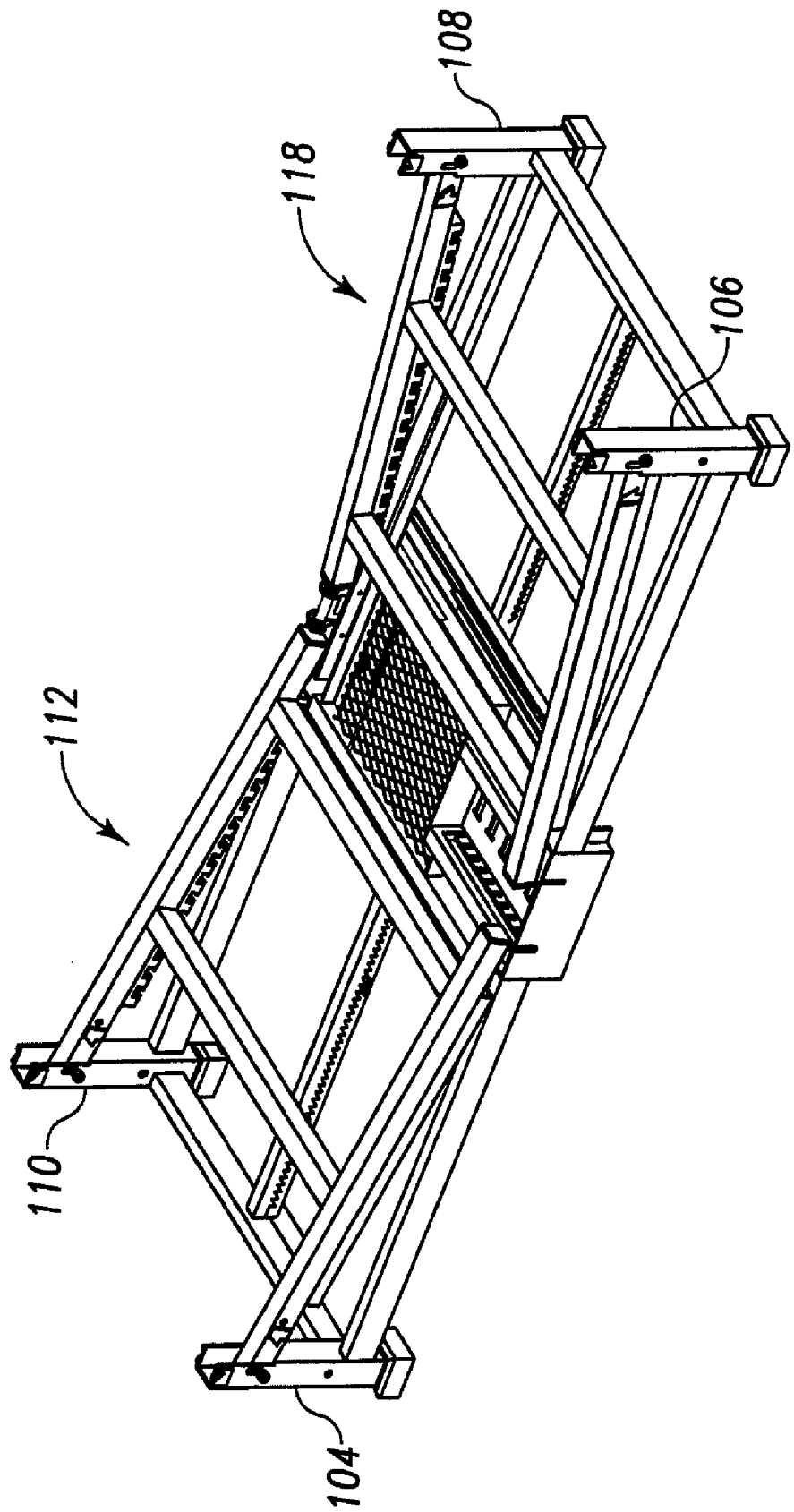
FIG. 17 is a perspective view of a pallet in accordance with the present invention in a folded compact configuration.

Initially, side frames 112 and 118 are folded into an upright compact position as shown in FIG. 17. As side frames 112 and 118 are brought into an upright position, the slot on each of posts 114, 116, 118 and 120 are allowed to slide past pins, including pin 202, located in stubs 104, 106, 108 and 110, allowing posts 114, 116, 118 and 120 to slide into stubs 104, 106, 108 and 110. As post 114 slides into stub 104, latch 210 engages pin 202, preventing side frame 112 from moving upwardly within stub 104 and stub 110. A similar process occurs with respect to side frame 118.

The next series of steps may vary, depending upon the type of pallet being loaded, full, partial, or mixed. For each type, however, the following series of steps will place the loaded windshields and dunnage in a compressed condition, fixing the windshields along the longitudinal axis of the pallet.

When loading a full pallet, loading may be commenced starting with the foremost windshield. The operator installs front support bar 128 at the desired height, and places lower front stop 142 in the upright position. The convex side of the windshield is placed against front stop 128 and lower front stop 142. The lower edge of the windshield is rested on top of longitudinal members 130 and 132. Dunnage is then placed along the concave side of the foremost windshield and the rest of the windshields are loaded with alternating layers of dunnage. When no additional windshields can be loaded while maintaining the ears of the rearmost windshield within the plane defined by post 116 and post 122, the pallet is fully loaded.

Figure 16:
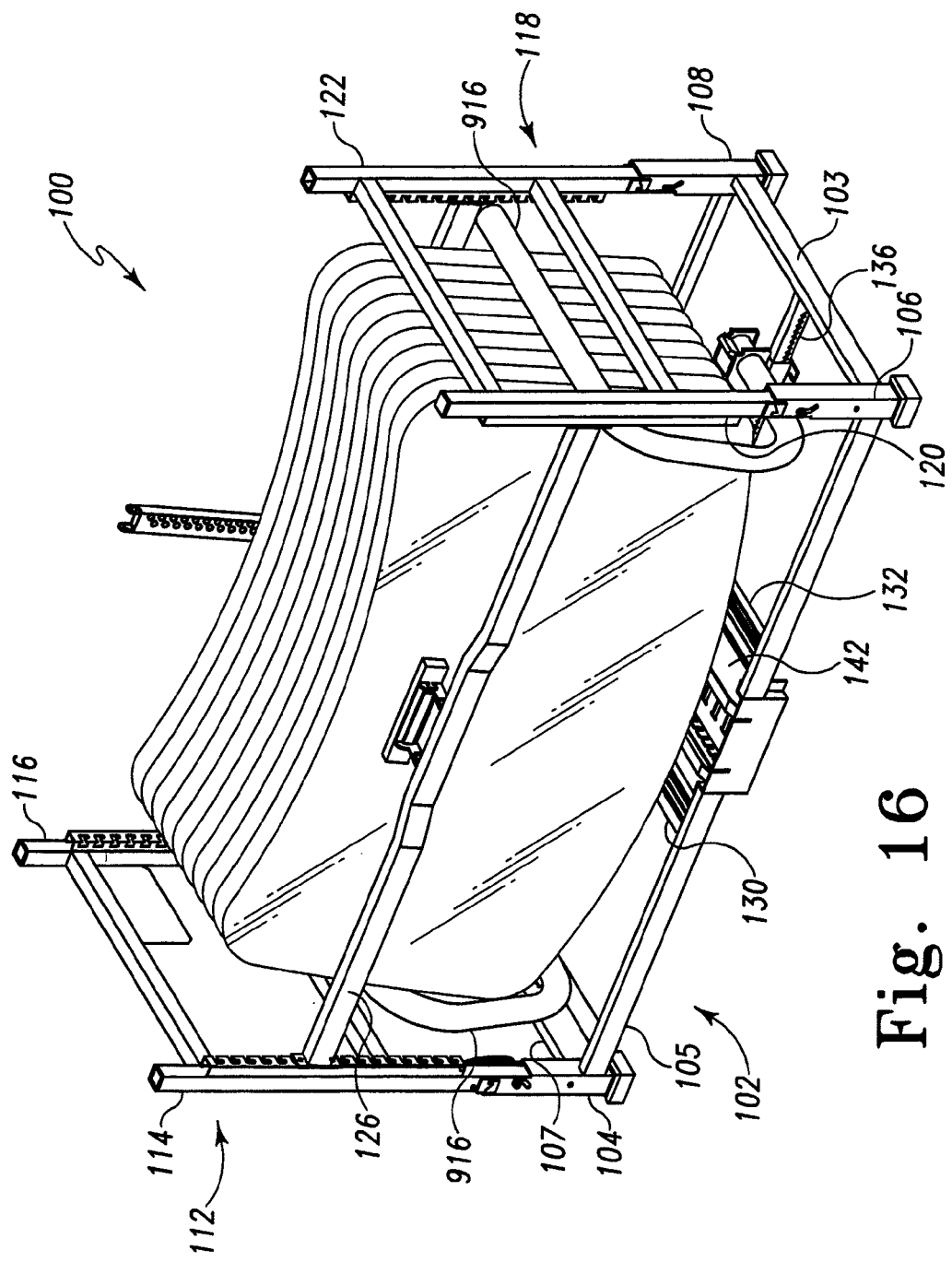
FIG. 16 is a perspective view of one embodiment of a pallet in accordance with the present invention loaded with windshields.

Next, the operator determines the appropriate protuberance of insert 710 to be placed in the upright position. The appropriate protuberance is one that will place the windshields and dunnage into compression when insert 710 is placed into channel 702 of longitudinal member 130. The insert for longitudinal member 132 is similarly positioned. At this time, the operator positions rear support bar 124 at the desired height, and rotates the desired stop, stop 610, 612, 614 or 616, with resilient pad 622 attached thereto, into position. This places the upper portion of the loaded windshields and dunnage into compression. A fully loaded pallet is shown in FIG. 16.

When loading a partial pallet, the operator begins with the windshield that will be placed in the rearmost position. In consideration of the curvature of the windshield, the operator rotates the inserts in the longitudinal members, as described above with respect to insert 710 and longitudinal member 130. Next, rear support bar 124 is installed by placing pins 602, 604, 606 and 608 in the desired slots of posts 116 and 122. Then, the desired stop is rotated into place and secured with a detent pin. The rearmost windshield is then loaded into pallet 100.

At this point, the rearmost windshield should be completely forward of the plane defined by post 116 and 122, and in a nearly upright position. The operator then places additional windshields on the pallet with some amount of dunnage placed between the windshields. Next, telescoping member 624 is elevated to and secured at the lowest position possible while maintaining the top of rounded channel area 632 above the tallest windshield. Then, a strap is routed from frame 102 of pallet 100 over the top of rounded channel area 632 and over the top of the loaded windshields. The strap is then routed over a semi-rigid member, such as an oak plank, and protective dunnage that is placed adjacent the foremost windshield and connected to locking bar 138 at a point near the foremost windshield. A ratchet (not shown) may then be used to tighten the strap.

As the strap is tightened, the oak plank bends to conform to the shape of the foremost windshield, and the windshields in the pallet are sandwiched between the oak plank, resilient pad 622 attached to the selected stop on rear support bar 124, and the upright protuberances of the inserts on longitudinal members 130 and 132. Typically, sufficient pressure is placed on the semi-rigid member so that it substantially engages the foremost windshield along the height of the windshield. It has been discovered that white oak of about ½ inch thickness provides adequate flexibility and strength to substantially conform to the windshield while providing adequate support. Of course, other materials may be used.

A mixed pallet is secured in much the same way as a partial pallet. The sole difference is that the strap is attached to lower front stop 142 for a mixed pallet rather than locking bar 138. In both the mixed pallet and partial pallet application, telescoping member 624 and the strap serve as a means for adapting the pallet to secure a variety of windshields based upon the windshields to be shipped.

Once the windshields have been secured within the forward and rearward planes defined by the rigid upright members in accordance with one of the foregoing methods, then the windshields can be secured against lateral movement. This is accomplished by installing side restraints onto transverse members 134 and 136. With the base plate removed, side restraints are placed on transverse members 134 and 136 as described above with reference to FIGS. 9 and 10. The side restraints are then pushed toward the center of pallet 100 until the arms contact the longest windshield(s). Fixing the longest windshield in this manner provides sufficient support to eliminate most lateral movement, even when smaller windshields do not contact the support arms as occurs when shipping a mixed pallet. Even if some movement occurs, however, the arms on the side restraints will ensure that all windshields in the pallet are maintained within the box defined by the upright rigid members of the pallet. Thus, each side restraint serves as a means for adapting the pallet to secure a variety of windshields based upon the windshields to be shipped.

The final step is to verify that the top of the highest windshield is lower than the top of side frames 112 and 118. If needed, extensions such as the one shown in FIG. 8 may be used to ensure the upper sides of the loaded windshields are within the box defined by the side frames and extensions if used. In either configuration, other pallets may be placed on top of pallet 100, and pallet 100 may be placed on top of other loaded pallets because the flared ends of the stubs are sized to receive the upper end of both the extensions and the posts.

Unloading is accomplished, for the most part, by reversing the above steps. The main difference is that the side restraints are initially released by pulling a cable attached to hole 914 of pawl 902. Once the windshields are unloaded, equipment removed from the pallet, such as the support bars, extensions, strap and side restraints, may be placed in the rack for storage. The side frames may then be collapsed onto frame 102. In this configuration, other pallets may be placed on top of pallet 100, and pallet 100 may be placed on top of other pallets because the flared ends of the stubs are sized to receive the upper end of the stubs.

Figure 18:
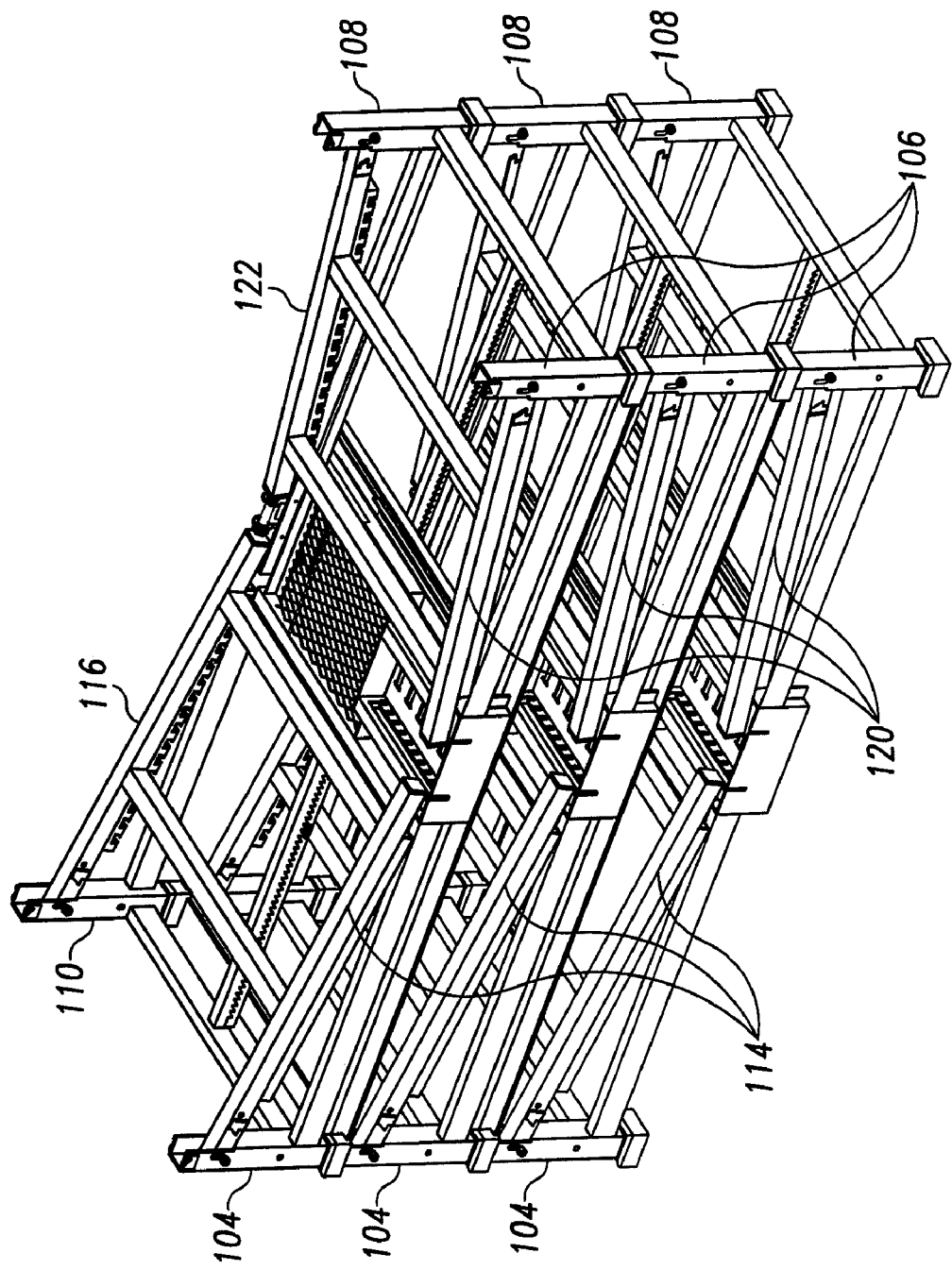
FIG. 18 is a perspective view of three folded pallets in accordance with the present invention stacked together.

Accordingly, the present invention provides a device which allows for shipment of vehicle replacement glass of non-uniform shape and/or size while minimizing breakage of the glass in shipping. The invention further provides a device that minimizes the required amount of dunnage, and is simple to use. Moreover, the present invention is of simple, lightweight and inexpensive construction. The present invention also provides a device that is stackable even when empty and collapsed. For example, FIG. 18 illustrates three pallets of the present invention stacked on top of one another. This compact configuration allows pallets to be shipped back for refilling in a much smaller space. The present invention is versatile enough to ship tall windshields without wasting weight and volume when shipping short windshields. The present invention further provides stops which use a minimum number of parts and which can be quickly and easily changed to the proper distance of protrusion into the pallet. Moreover, the present invention provides a collapsible pallet that will not lean when stacked. Additionally, the present invention provides a restraint which is quickly and easily repositioned to the lateral position dictated by the longest windshield in the pallet being shipped.

While the present invention has been described in detail with reference to certain exemplary embodiments thereof, such are offered by way of non-limiting example of the invention, as other versions are possible. Moreover, a number of design choices exist within the scope of the present invention, some of which have been discussed above. It is anticipated that a variety of other modifications and changes will be apparent to those having ordinary skill in the art and that such modifications and changes are intended to be encompassed within the spirit and scope of the invention as defined by the following claims.

What is claimed is:

1. A re-useable shipping pallet comprising:
    a. a base;
    b. a first, a second, a third and a fourth post extending from the base and foldable toward the base, each post comprising, an upper section and a lower section, and wherein the first and second posts comprise,
    c. a latch and pin mechanism for maintaining the upper sections of the first and second posts in fixed relationship with the lower sections of the first and second posts, respectively when the pallet is in an expanded form;
    d. a front support bar removably attached between any two of said first, second, third, or four posts, said front support bar having a front stop positioned thereon and adapted to support a surface of a windshield positioned within said base; and
    e. a rear support bar removably attached between any two of said first, second, third, or four posts and opposite the front support bar, said rear support bar having at least one rear stop that projects into a space defined by the first, second, third, and fourth posts.

2. The pallet of claim 1, wherein the latch and pin mechanism of the first and second lower sections comprise,
    a. a pin rigidly protruding from the lower section of the first post and the second post, and
    b. a latch rotatably attached to the upper section of the first post and the second post.

3. A re-useable shipping pallet for shipping windshields comprising:
    a. a base in a substantially horizontal plane configured to support one or more windshields of varying sizes,
    b. a telescoping member, having an upper section attached to the base, the telescoping member extending in a plane perpendicular to the plane of the base and adjustable to maintain the upper section at any of a plurality of heights above the base, and
    c. at least one rear support bar having a strap operable to adjust the height of at least one pivotable stop with respect to the rear support bar, the rear support bar being engageable with the pallet for retaining the windshields on the pallet, and the at least one rear support bar having a stop engageable with the pallet for retaining the windshields on the pallet.

4. A re-useable shipping pallet for shipping windshields comprising,
    a. a base configured to support one or more windshields of varying curvature,
    b. means for mounting a plurality of stops to the base, and
    c. a plurality of stops pivotably mounted above the base and having a pivot axis and at least one rigid arm, each of the plurality of stops having an effective radius, each effective radius different from the effective radius of another of the plurality of stops, the effective radius being selectable to engage and retain the one or more windshields of varying curvature
    d. wherein each of the plurality of stops is mounted at a common pivot axis; and
    e. wherein the means for mounting comprises, a first and a second post extending from the base, and a cross bar, connectable to the first and second post at a plurality of locations, wherein the plurality of stops are pivotably mounted to the cross bar.

* * * * *